US007926931B2

(12) United States Patent
Katsuragi et al.

(10) Patent No.: US 7,926,931 B2
(45) Date of Patent: Apr. 19, 2011

(54) INK AND INK JET RECORDING METHOD

(75) Inventors: Ryuji Katsuragi, Kawasaki (JP);
Yasuharu Notoya, Tokyo (JP); Shoji Koike, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 480 days.

(21) Appl. No.: 11/955,499

(22) Filed: Dec. 13, 2007

(65) Prior Publication Data

US 2008/0260948 A1    Oct. 23, 2008

(30) Foreign Application Priority Data

Dec. 20, 2006 (JP) ................................. 2006-342192

(51) Int. Cl.
*G01D 11/00* (2006.01)

(52) U.S. Cl. .................... 347/100; 106/31.6; 523/160

(58) Field of Classification Search ............ 347/95–100; 106/31.13, 31.6; 523/160
See application file for complete search history.

(56) References Cited

U.S. PATENT DOCUMENTS

| | | | |
|---|---|---|---|
| 4,313,124 A | 1/1982 | Hara | 346/140 R |
| 4,345,262 A | 8/1982 | Shirato et al. | 346/140 R |
| 4,459,600 A | 7/1984 | Sato et al. | 346/140 R |
| 4,463,359 A | 7/1984 | Ayata et al. | 346/1.1 |
| 4,557,761 A | 12/1985 | Kobayashi et al. | 106/22 |
| 4,558,333 A | 12/1985 | Sugitani et al. | 346/140 R |
| 4,632,703 A | 12/1986 | Koike et al. | 106/22 |
| 4,661,158 A | 4/1987 | Kobayashi et al. | 106/22 |
| 4,689,078 A | 8/1987 | Koike et al. | 106/22 |
| 4,702,742 A | 10/1987 | Iwata et al. | 8/495 |
| 4,723,129 A | 2/1988 | Endo et al. | 346/1.1 |
| 4,725,849 A | 2/1988 | Koike et al. | 346/1.1 |
| 4,740,796 A | 4/1988 | Endo et al. | 346/1.1 |
| 4,838,938 A | 6/1989 | Tomida et al. | 106/22 |
| 4,849,770 A | 7/1989 | Koike et al. | 346/1.1 |
| 4,853,036 A | 8/1989 | Koike et al. | 106/20 |
| 4,923,515 A | 5/1990 | Koike et al. | 106/22 |
| 4,957,553 A | 9/1990 | Koike et al. | 106/20 |
| 4,965,609 A | 10/1990 | Tomida et al. | 346/1.1 |
| 4,965,612 A | 10/1990 | Sakaki et al. | 346/1.1 |
| 4,969,951 A | 11/1990 | Koike et al. | 106/22 |
| 4,973,499 A | 11/1990 | Iwata et al. | 427/261 |
| 4,986,850 A | 1/1991 | Iwata et al. | 106/25 |
| 5,017,227 A | 5/1991 | Koike et al. | 106/22 |
| 5,053,078 A | 10/1991 | Koike et al. | 106/22 |
| 5,067,980 A | 11/1991 | Koike et al. | 106/22 |
| 5,075,699 A | 12/1991 | Koike et al. | 346/1.1 |
| 5,099,255 A | 3/1992 | Koike et al. | 346/1.1 |
| 5,101,217 A | 3/1992 | Iwata et al. | 346/1.1 |
| 5,118,351 A | 6/1992 | Shirota et al. | 106/22 |
| 5,124,718 A | 6/1992 | Koike et al. | 346/1.1 |
| 5,141,558 A | 8/1992 | Shirota et al. | 106/22 |
| 5,151,128 A | 9/1992 | Fukushima et al. | 106/20 |
| 5,160,370 A | 11/1992 | Suga et al. | 106/20 |
| 5,190,581 A | 3/1993 | Fukushima et al. | 106/20 D |
| 5,220,347 A | 6/1993 | Fukushima et al. | 346/1.1 |
| 5,221,333 A | 6/1993 | Shirota et al. | 106/20 D |
| 5,229,786 A | 7/1993 | Suga et al. | 346/1.1 |
| 5,248,991 A | 9/1993 | Shirota et al. | 346/1.1 |
| 5,250,121 A | 10/1993 | Yamamoto et al. | 106/22 R |
| 5,254,157 A | 10/1993 | Koike et al. | 106/20 D |
| 5,257,036 A | 10/1993 | Koike et al. | 346/1.1 |
| 5,258,066 A | 11/1993 | Kobayashi et al. | 106/22 R |
| 5,296,022 A | 3/1994 | Kobayashi et al. | 106/20 D |
| 5,329,305 A | 7/1994 | Fukushima et al. | 347/95 |
| 5,358,558 A | 10/1994 | Yamamoto et al. | 106/22 R |
| 5,380,358 A | 1/1995 | Aoki et al. | 106/20 R |
| 5,396,275 A | 3/1995 | Koike et al. | 347/101 |
| 5,451,251 A * | 9/1995 | Mafune et al. | 106/31.48 |
| 5,468,553 A | 11/1995 | Koike et al. | 428/224 |
| 5,494,733 A | 2/1996 | Koike et al. | 428/224 |
| 5,500,023 A | 3/1996 | Koike et al. | 8/499 |
| 5,515,093 A | 5/1996 | Haruta et al. | 347/101 |
| 5,540,764 A | 7/1996 | Haruta et al. | 106/20 R |
| 5,594,485 A | 1/1997 | Koike et al. | 347/101 |
| 5,645,631 A | 7/1997 | Koike et al. | 106/31.36 |
| 5,658,376 A | 8/1997 | Noguchi et al. | 106/31.43 |
| 5,686,951 A | 11/1997 | Koike et al. | 347/106 |
| 5,698,478 A | 12/1997 | Yamamoto et al. | 442/153 |
| 5,718,793 A | 2/1998 | Inamoto et al. | 156/235 |
| 5,734,403 A * | 3/1998 | Suga et al. | 347/101 |
| 5,764,261 A | 6/1998 | Koike et al. | 347/100 |
| 5,781,216 A | 7/1998 | Haruta et al. | 347/106 |
| 5,782,967 A | 7/1998 | Shirota et al. | 106/31.58 |
| 5,902,387 A | 5/1999 | Suzuki et al. | 106/22 R |
| 5,922,625 A | 7/1999 | Haruta et al. | 442/75 |
| H1828 H * | 1/2000 | Wong et al. | 523/161 |
| 6,033,066 A | 3/2000 | Koike et al. | 347/101 |
| 6,036,307 A | 3/2000 | Hakamada et al. | 347/106 |

(Continued)

FOREIGN PATENT DOCUMENTS

JP     54-51837     4/1979

(Continued)

*Primary Examiner* — Matthew Luu
*Assistant Examiner* — Rut Patel
(74) *Attorney, Agent, or Firm* — Fitzpatrick, Cella, Harper & Scinto

(57) ABSTRACT

An ink used in an ink jet recording method in which ink droplets are ejected from a recording head by the action of thermal energy to record an image on a recording medium; the ink being characterized by containing (a) a pigment, (b) a dispersing agent, (c) a liquid medium, (d) a polyglycerol and (e) at least one selected from a potassium salt of a carboxylic acid, a rubidium salt of a carboxylic acid and a cesium salt of a carboxylic acid.

6 Claims, No Drawings

U.S. PATENT DOCUMENTS

| | | | |
|---|---|---|---|
| 6,139,939 A | 10/2000 | Haruta et al. | 428/195 |
| 6,214,963 B1 | 4/2001 | Noguchi et al. | 528/71 |
| 6,394,597 B1 | 5/2002 | Koike et al. | 347/106 |
| 6,398,355 B1 | 6/2002 | Shirota et al. | 347/100 |
| 6,425,659 B1 * | 7/2002 | Katsuragi et al. | 347/56 |
| 6,426,766 B1 | 7/2002 | Shirota et al. | 347/106 |
| 6,474,803 B1 | 11/2002 | Shirota et al. | 347/100 |
| 6,552,156 B2 | 4/2003 | Noguchi et al. | 528/71 |
| 6,613,821 B2 | 9/2003 | Suzuki et al. | 524/111 |
| 6,619,791 B2 | 9/2003 | Tochihara et al. | 347/100 |
| 6,676,254 B2 | 1/2004 | Nagashima et al. | 347/100 |
| 6,698,876 B2 | 3/2004 | Sato et al. | 347/100 |
| 6,723,137 B1 | 4/2004 | Hakamada et al. | 8/549 |
| 6,874,881 B2 | 4/2005 | Suzuki et al. | 347/100 |
| 7,029,109 B2 | 4/2006 | Shirota et al. | 347/100 |
| 7,055,943 B2 | 6/2006 | Suzuki et al. | 347/100 |
| 7,141,105 B2 | 11/2006 | Udagawa et al. | 106/31.49 |
| 7,144,449 B2 | 12/2006 | Udagawa et al. | 106/31.15 |
| 7,185,978 B2 | 3/2007 | Nagashima et al. | 347/100 |
| 7,306,664 B2 | 12/2007 | Kato et al. | 106/31.43 |
| 2002/0008725 A1 * | 1/2002 | Katsuragi et al. | 347/28 |
| 2002/0054195 A1 * | 5/2002 | Ishinaga et al. | 347/100 |
| 2004/0187733 A1 * | 9/2004 | Ogawa et al. | 106/31.13 |
| 2006/0037513 A1 * | 2/2006 | Taguchi | 106/31.43 |
| 2006/0119680 A1 | 6/2006 | Kato et al. | 347/100 |
| 2006/0155008 A1 * | 7/2006 | Nakamura et al. | 523/205 |
| 2006/0222851 A1 * | 10/2006 | Miyabayashi et al. | 428/408 |
| 2007/0029522 A1 | 2/2007 | Udagawa et al. | 252/301.16 |
| 2007/0034114 A1 | 2/2007 | Udagawa et al. | 106/31.15 |
| 2007/0176992 A1 * | 8/2007 | Arai et al. | 347/100 |
| 2007/0256593 A1 | 11/2007 | Koike et al. | 106/31.28 |

FOREIGN PATENT DOCUMENTS

| | | |
|---|---|---|
| JP | 59-123670 | 7/1984 |
| JP | 2-255875 | 10/1990 |
| JP | 4-57859 | 2/1992 |
| JP | 4-57860 | 2/1992 |
| JP | 6-99656 | 4/1994 |

* cited by examiner

INK AND INK JET RECORDING METHOD

BACKGROUND OF THE INVENTION

1. Field of the Invention

This invention relates to an ink used in ink-jet recording in which ink droplets are ejected from a recording head by the action of thermal energy to record images on a recording medium, and an ink jet recording method making use of such an ink. More particularly, this invention relates to an ink which can improve ejection stability of inks making use of pigments as coloring materials and can achieve a high fastness when images are recorded using the ink, and an ink jet recording method making use of such an ink.

2. Description of the Related Art

Various systems have conventionally been proposed in the printing that employs an ink jet recording method. Of these, for example, an ink jet recording method disclosed in Japanese Patent Application Laid-open No. S54-51837 in which ink is ejected in the form of ink droplets by the action of thermal energy (what is called a BUBBLE JET (registered trademark of CANON INC.) process) facilitates a high-density multi-nozzle very much. Hence, this process has characteristic features that high-quality images are obtainable at a high speed and at a very low cost, and that images are printable also on plain paper, which does not have any special coating layer. In this recording process, a heater of the recording head is rapidly heated, whereupon a liquid on the heater comes into air bubbles to cause an abrupt increase in volume. In virtue of the force of action standing on this abrupt increase in volume, ink droplets are ejected from nozzles at the tip of the recording head and fly therefrom to the recording medium to adhere thereto, thus printing is performed.

In such an ink jet recording method, it is usual to use aqueous dye inks. Recently, however, it has come to be attempted to use aqueous pigment inks in the ink-jet recording. The reason therefor is that the latter is the best material that can give fastness such as water resistance or light-fastness to images formed using the aqueous pigment inks. As to such aqueous pigment inks, ink-jet recording aqueous pigment inks satisfying basic properties such as image recording quality level, ink ejection performance, storage stability, anti-clogging and fixability are disclosed in, e.g., Japanese Patent Applications Laid-open Nos. H02-255875, H04-334870, H04-057859 and H04-057860.

However, as a problem that may arise when an aqueous pigment ink is ejected by the BUBBLE JET (registered trademark) process, it comes about that the ink is exposed to high temperature at the heater surface of the recording head. The BUBBLE JET (registered trademark) process is greatly characterized in its possibility for higher nozzle density, and is superior in this regard. However, components contained in the pigment ink may change in properties because of an effect due to the high temperature at the heater surface of the recording head to become accumulated on the heating element surface as deposits. With accumulation of such deposits, it may come about that the heater of the recording head comes to have, at its surface, poorer heat conduction performance with time, so that the impact pressure accompanying the bubbling of ink becomes lower, resulting in a deterioration of ejection performance, and furthermore resulting in a poor quality of recorded images.

SUMMARY OF THE INVENTION

Accordingly, an object of the present invention is to provide an ink which can achieve a good ejection performance when used in the image forming process carried out by the BUBBLE JET (registered trademark) process, and further to provide an ink making use of a pigment as a coloring material, which can obtain high-grade images superior in fastness such as water resistance or light-fastness, and an ink jet recording method making use of such an ink.

The above objects can be achieved by the present invention described below. That is, the present invention provides an ink used in an ink jet recording method in which ink droplets are ejected from a recording head by the action of thermal energy to record an image on a recording medium, which is an ink characterized by containing (a) a pigment, (b) a dispersing agent, (c) a liquid medium, (d) a polyglycerol and (e) at least one selected from a potassium salt of a carboxylic acid, a rubidium salt of a carboxylic acid and a cesium salt of a carboxylic acid.

The present invention also provides an ink jet recording method characterized by having the step of ejecting the above ink of the present invention from a recording head by the action of thermal energy to record an image on a recording medium.

Where images are recorded by using the ink of the present invention in an ink-jet printer of the BUBBLE JET (registered trademark) system, there can very effectively be less deposits on the surface of a heater set up for providing an ink with thermal energy to eject a pigment ink from ink orifices, and this enables stabilization of ejection performance.

The reason why the use of the ink of the present invention brings out such an effect of making ejection performance stable is unclear. According to studies made by the present inventors, it is presumed that in the ink, the component-(d) polyglycerol has a very high viscosity and hence, even though the ink is exposed to high temperature at the heater surface, the polyglycerol acts as an adhesive between pigment particles and a resin to prevent the pigment particles and the resin from separating to make the pigment have a low dispersibility.

It is also presumed as follows: Metal ions of the component-(e) at least one selected from a potassium salt of a carboxylic acid, a rubidium salt of a carboxylic acid and a cesium salt of a carboxylic acid have a larger ionic radius than lithium ions or sodium ions. Hence, because of steric hindrance, the metal ions of the component (e) inhibit association of the carboxyl group or sulfonic group which is a solubilizing group of the resin. This inhibition of association prevents dehydration reaction of the carboxyl group or sulfonic group such as acid anhydride reaction due to heat. Thus, even though the ink is exposed to high temperature at the heater surface, the solubilizing group of the resin is prevented from being thermally decomposed to make the pigment have a low dispersibility.

It is further presumed as follows: The carboxylic acid is weakly acidic, and hence the component (e) potassium salt, rubidium salt or cesium salt of the carboxylic acid becomes weakly alkaline to improve the solubility of the resin, bringing an improvement in the dispersibility of the pigment. Synergism attributable to the above polyglycerol and at least one selected from the potassium salt, rubidium salt and cesium salt of the carboxylic acid brings the stabilization of ejection performance.

As stated above, according to the present invention, it can provide an ink making use of a pigment as a coloring material, which can achieve a good ejection stability and further can obtain high-grade images with fastness such as water resistance or light-fastness when used in the image forming process carried out by the BUBBLE JET (registered trademark)

process. Also, the present invention can provide an ink jet recording method making use of the above ink.

Further features of the present invention will become apparent from the following description of exemplary embodiments.

DESCRIPTION OF THE EMBODIMENTS

The present invention is described below in detail by giving preferred embodiments.

The pigment ink according to the present invention is described first. The ink contains as its constituents (a) a pigment, (b) a dispersing agent, (c) a liquid medium, (d) a polyglycerol and (e) at least one selected from a potassium salt of a carboxylic acid, a rubidium salt of a carboxylic acid and a cesium salt of a carboxylic acid. The present inventors have made extensive studies on how to stabilize the ejection of pigment inks in the recording process of the BUBBLE JET (registered trademark) system. As the result, they have discovered that the use of the components (d) and (e) in the ink to be used enables very effective stabilization of ejection performance. Thus, they have accomplished the present invention. The respective constituents of the ink of the present invention are described below.

Component (d)

The component (d) that characterizes the ink of the present invention is described first. The component (d) used in the present invention is a polyglycerol. The polyglycerol may include diglycerol, triglycerol, tetraglycerol, pentaglycerol, hexaglycerol, heptaglycerol, octaglycerol, nonaglycerol and decaglycerol. It may also include a polyglycerol having a weight average molecular weight of from 200 to 1,000 which is a mixture of any of diglycerol, triglycerol, tetraglycerol, pentaglycerol, hexaglycerol, heptaglycerol, octaglycerol, nonaglycerol and decaglycerol. Of these, diglycerol is particularly preferred because it is readily available and is inexpensive.

When the ink according to the present invention is prepared, the above component (d) may preferably be used in a total content ranging from 0.5% by mass to 20% by mass based on the total mass of the ink. It may more preferably be in a total content ranging from 1% by mass to 15% by mass based on the total mass of the ink. Setting its content within this range enables the ink to be obtainable which has a superior effect of stabilizing the ejection and also can not easily cause nozzle clogging of the recording head.

Component (e)

The component (e) that characterizes the ink according to the present invention is described next. The component (e) used in the present invention may include at least one selected from a potassium salt of a carboxylic acid, a rubidium salt of a carboxylic acid, and a cesium salt of a carboxylic acid. Stated specifically, it may include potassium acetate, potassium propionate, monopotassium oxalate, dipotassium oxalate, monopotassium malonate, dipotassium malonate, monopotassium succinate, dipotassium succinate, monopotassium glutarate, dipotassium glutarate, monopotassium adipate, dipotassium adipate, monopotassium malate, dipotassium malate, monopotassium tartrate, dipotassium tartrate, monopotassium citrate, dipotassium citrate, tripotassium citrate, potassium benzoate, potassium phthalate, potassium isophthalate, potassium terephthalate, potassium 1-naphthoate, potassium 2-naphthoate, rubidium acetate, and cesium acetate.

As the component (e), any of compounds commercially available in the form of potassium salts may be used as they are. Instead, any of potassium salts, rubidium salts, and cesium salts may be used which have been produced by adding any of potassium hydroxide, rubidium hydroxide, and cesium hydroxide to carboxylic acids.

When the ink according to the present invention is prepared, the component (e) as enumerated above may be used alone of course, or two or more types selected from the above compounds may be used in combination. The above component (e) may preferably be used in a total content ranging from 0.005% by mass to 5% by mass based on the total mass of the ink. It may more preferably be in a total content ranging from 0.05% by mass to 1% by mass based on the total mass of the ink. Setting its content within this range enables the ink to be obtainable which has a superior effect of stabilizing the ejection and also can not easily cause nozzle clogging of the recording head.

(a) Pigment

The pigment which is the component (a) of the ink according to the present invention is described next. As the pigment, all sorts of pigments may be used, such as inorganic pigments and organic pigments. Stated specifically, those enumerated below may be used, but are by no means limited to these.

Carbon black; C.I. Pigment Yellow 1, 2, 3, 12, 13, 14, 16, 17, 73, 74, 75, 83, 93, 95, 97, 98, 114, 128, 129, 151, 154 and 195; C.I. Pigment Red 5, 7, 12, 48 (Ca), 48 (Mn), 57 (Ca), 57:1, 57 (Sr), 112, 122, 123, 168, 184 and 202; C.I. Pigment Blue 1, 2, 3, 15:3, 15:34, 16, 22 and 60; and C.I. Vat Blue 4 and 6.

The pigment as enumerated above which is used as a coloring material of the ink of the present invention may be used alone, or may be used in combination of two or more types. As to the concentration of the pigment, there are no particular limitations thereon. Usually, it may appropriately be selected within the range of from 0.1% by mass to 20% by mass based on the total mass of the ink.

(b) Dispersing Agent

When the pigment, as enumerated above, is used as a coloring material of the ink, the component (b) dispersing agent is used in order for the pigment to be stably dispersed in the ink. A polymeric dispersing agent or a surface active agent type dispersing agent may be used as the dispersing agent.

As the polymeric dispersing agent, usable are, e.g., polyacrylates, styrene-acrylic acid copolymer salts, styrene-methacrylic acid copolymer salts, styrene-acrylic acid-acrylate copolymer salts, styrene-maleic acid copolymer salts, acrylate-maleic acid copolymer salts, styrene-methacrylsulfonic acid copolymer salts, vinylnaphthalene-maleic acid copolymer salts, β-naphthalenesulfonic acid formalin condensation product salts, polyvinyl pyrrolidone, polyethylene glycol, and polyvinyl alcohol. Of these, particularly preferred are those having a weight average molecular weight in the range of from 1,000 to 30,000 and an acid value in the range of from 100 to 430.

The surface active agent type dispersing agent may include, e.g., laurylbenzenesulfonates, laurylsulfonates, laurylbenzenecarboxylates, laurylnaphthalenesulfonates, aliphatic amine salts, and polyethylene oxide condensation products. Any of these dispersing agents may be used in an amount ranging from pigment mass: dispersing agent mass =10:5 to 10:0.5.

(c) Liquid Medium

The liquid medium as the component (c) making up the ink according to the present invention is described next. As the liquid medium, one which contains water may preferably be used. In particular, a mixed medium may preferably be used which makes use of water and a water-soluble organic solvent in combination. As the water, it is desirable to use not usual water containing various ions, but deionized water. The water may preferably be in a content ranging from 35% by mass to 96% by mass based on the total mass of such a water base ink.

The water-soluble organic solvent is used for various purposes of, e.g., adjusting the viscosity of ink to a suitable viscosity preferable for use, and lowering the drying rate of the ink and improving the solubility of coloring material to prevent recording head nozzles from clogging. The water-soluble organic solvent may preferably be used in the ink in a total content ranging from 0.5% by mass to 20% by mass based on the total mass of the ink. It may further preferably be used in a total content ranging from 1% by mass to 15% by mass based on the total mass of the ink. Its use, within the above range, enables the ink to be obtainable which has a superior effect of stabilizing the ejection and also can not easily cause nozzle clogging of the recording head.

The water-soluble organic solvent to be used in the above, may, stated specifically, include, e.g., alkyl alcohols having 1 to 5 carbon atoms, such as methyl alcohol, ethyl alcohol, n-propyl alcohol, isopropyl alcohol, n-butyl alcohol, sec-butyl alcohol, tert-butyl alcohol, isobutyl alcohol and n-pentanol; amides such as dimethylformamide and dimethylacetamide; ketones or ketoalcohols such as acetone and diacetone alcohols; ethers such as tetrahydrofuran and dioxane; oxyethylene or oxypropylene copolymers such as diethylene glycol, triethylene glycol, tetraethylene glycol, dipropylene glycol, tripropylene glycol, polyethylene glycol and polypropylene glycol; alkylene glycols whose alkylene groups have 2 to 6 carbon atoms, such as ethylene glycol, propylene glycol, trimethylene glycol, triethylene glycol and 1,2,6-hexanetriol; glycerol; trimethylol ethane and trimethylol propane; lower alkyl ethers such as ethylene glycol monomethyl (or ethyl)ether, diethylene glycol monomethyl (or ethyl)ether and triethylene glycol monomethyl (or ethyl) ether; lower dialkyl ethers of polyhydric alcohols, such as triethylene glycol dimethyl (or ethyl)ether and tetraethylene glycol dimethyl (or ethyl)ether; alkanolamines such as monoethanolamine, diethanolamine and triethanolamine; and sulfolane, N-methyl-2-pyrrolidone, 2-pyrrolidone, and 1,3-dimethyl-2-imidazolidinone. The water-soluble organic solvent as described above may be used alone or in the form of a mixture. Any of the water-soluble organic solvents as enumerated above may be used alone or in the form of a mixture of two or more types.

Additives

In the ink according to the present invention, besides the foregoing components, conventionally known commonly available various additives may optionally be incorporated. Such additive may include, e.g., a viscosity modifier, a pH adjuster, a mildew-proofing agent, an anticeptic, an antioxidant, an antifoaming agent, a surface-active agent, and a nozzle drying preventive agent such as urea. Any of these may be added under appropriate selection.

Physical Properties of Ink

The ink according to the present invention, having composition as described above, is used in the ink jet recording method in which ink droplets are ejected from a recording head by the action of thermal energy to record images on a recording medium. Hence, the ink of the present invention may preferably be one having, as its physical properties, values within the following ranges. That is, as its values at about 25° C., pH may preferably be in the range of from 3 to 12, and more preferably from 4 to 10; surface tension may preferably be in the range of from 10 to 60 mN/m (dyn/cm), and more preferably from 15 to 50 mN/m (dyn/cm); and viscosity may preferably be in the range of from 1 to 30 cps (mPa·s), and more preferably from 1 to 10 cps (mPa·s).

An ink-jet recording apparatus preferable for recording images on the recording medium by using the ink described above is described next.

Ink-jet Recording Apparatus

The ink-jet recording apparatus which carries out the ink jet recording method of the present invention is characterized by having a means for ejecting the above ink of the present invention in the form of ink droplets, from a recording head by the action of thermal energy to record images on a recording medium. A preferable apparatus may include, e.g., ink-jet recording apparatus of a BUBBLE JET (registered trademark) system. The present invention brings an especially superior effect in the recording head or recording apparatus of the BUBBLE JET (registered trademark) system.

Typical construction and principles of such a recording system are disclosed in, e.g., U.S. Pat. Nos. 4,723,129 and 4,740,796. The recording process of the present invention may preferably be one carried out by these basic principles. This recording system is applicable to any of what are called an on-demand type and a continuous type. In particular, in the case of the on-demand type, this system has an advantage that ink ejection with especially good response can be achieved because the ink is ejected in the following way. In the on-demand type recording system, first, at least one drive signal corresponding to recording information and giving rapid temperature rise that exceeds nucleate boiling is applied to an electrothermal transducer disposed correspondingly to a sheet or fluid channels on or through which the ink is held, to generate thermal energy in the electrothermal transducer. Then, this thermal energy causes film boiling on the heat build-up face of a recording head, and consequently bubbles in ink can be formed one to one correspondingly to this drive signal.

Then, the growth and shrinkage of the bubbles cause the ink to be ejected through ejection orifices to form at least one ink droplet. Where this drive signal is applied in a pulse form, the growth and shrinkage of the bubbles take place instantly and appropriately, and hence the ejection of ink in an especially good response can be achieved, as being more preferable. As this drive signal of a pulse form, suited are those which are disclosed in U.S. Pat. Nos. 4,463,359 and 4,345,262. The employment of conditions disclosed in U.S. Pat. No. 4,313,124, which relates to the rate of temperature rise on the heat build-up face, enables performance of much superior recording.

As the recording head used in the ink jet recording method of the present invention, a recording head may be used which is made up by combination of an ejection orifice, a liquid channel and an electrothermal transducer as disclosed in the above respective U.S. patents (a linear fluid channel or a right-angle fluid channel). Besides, a recording head set up as disclosed in U.S. Pat. Nos. 4,558,333 and 4,459,600, which disclose construction in which a heat build-up part is disposed in a bent region, may also effectively be used in the ink jet recording method of the present invention. In addition, a recording head which is so set up that an ejection orifice common to a plurality of electrothermal transducers is provided as an ejection part of the electrothermal transducers (Japanese Patent Application Laid-open No. S59-123670, etc.) may also effectively be used in the ink jet recording method of the present invention.

Further, as a recording head of a full-line type, having a length corresponding to the maximum width of a recording medium on which an ink-jet recording apparatus can perform recording, what is as shown below may be used. It may be so set up that its length condition is fulfilled by combination of a plurality of recording heads as disclosed in the above publications, or may be so set up as to be one recording head which is integrally formed, either of which may be used. In the ink-jet recording apparatus having such a recording head, the above effect of the present invention can more effectively be brought out.

In addition, an exchangeable chip type recording head which, when set in the apparatus main body, enables electrical connection with the apparatus main body or feed of ink from the apparatus main body is also preferable as construction of the recording head used in the ink jet recording method of the present invention. Instead, a cartridge type recording head provided integrally in the recording head itself may also be effective as construction of the recording head used in the ink jet recording method of the present invention.

In the present invention, a restoration means, a preliminary auxiliary means and so forth for the recording head may also be added which are provided to set up the ink-jet recording apparatus to be used. This is preferable because the effect of the present invention can be made more stable. To give specific means, they are a capping means, a cleaning means and a pressure or suction means which are provided for the recording head; an electrothermal transducer or a heating means different therefrom, or a preliminary heating means set up by combination of these; and a preliminary ejection mode which performs ejection different from that for recording.

EXAMPLES

The present invention is described below in greater detail by giving Examples and Comparative Examples. The present invention is by no means limited by the following Examples as long as it is not beyond its gist. In the following, "part(s)" and "(%)" are by mass unless particularly noted.

Examples 1 to 7

Example 1

Preparation of Pigment Dispersion 1

| | |
|---|---|
| Styrene-acrylic acid-butyl acrylate copolymer (acid value: 116; weight average molecular weight: 3,700) | 5 parts |
| Triethanolamine | 0.5 part |
| Diethylene glycol | 5 parts |
| Water | 69.5 parts |

The above components were mixed, and the mixture obtained was heated to 70° C. with a water bath to make the resin component dissolve completely. To the solution obtained, 15 parts of carbon black "MA-100" ((pH: 3.5; available from Mitubishi Chemical Corporation) and 5 parts of 2-propanol were added, and these were premixed for 30 minutes, followed by dispersion treatment under the following conditions.
Dispersion machine: Sand grinder.
Grinding medium: Zirconium beads of 1 mm in diameter.
Packing of grinding medium: 50% by volume.
Grinding time: 3 hours.

Further, coarse particles were removed by centrifugal separation (at 12,000 rpm for 20 minutes) to obtain Pigment Dispersion 1, having a solid content of 20%.

Preparation of Ink

The following components were mixed in a beaker, and stirred at 25° C. for 3 hours, followed by pressure filtration using a micro-filter of 1.0 μm in pore size (available from Fuji Photo Film Co., Ltd.) to prepare an ink of Example 1, used in the present invention.

| | |
|---|---|
| Pigment Dispersion 1 | 30 parts |
| Diethylene glycol | 10 parts |
| Diglycerol | 10 parts |
| Potassium acetate | 1 part |
| Water | 49 parts |

Example 2

Preparation of Pigment Dispersion 2

| | |
|---|---|
| Styrene-acrylic acid copolymer (weight average molecular weight: about 7,000) | 3.5 parts |
| Potassium hydroxide | 1.0 part |
| Diethylene glycol | 5.0 parts |
| Ion-exchanged water | 65.5 parts |

First, the above components were put into a container and mixed, and the mixture obtained was heated to 70° C. with a water bath to make the resin component dissolve completely. Next, to the solution obtained, 24 parts of C.I. Pigment Yellow 93 and 1.0 part of isopropyl alcohol were added, and these were premixed for 30 minutes, followed by dispersion treatment carried out under the same conditions as those in preparing Pigment Dispersion 1 above. Further, the dispersion thus obtained was treated by centrifugal separation (at 12,000 rpm for 20 minutes) to remove coarse particles to obtain Pigment Dispersion 2, having a solid content of 25%.

Preparation of Ink

The following components were mixed in a beaker, and stirred at 25° C. for 3 hours, followed by pressure filtration using a micro-filter of 1.0 μm in pore size (available from Fuji Photo Film Co., Ltd.) to prepare an ink of Example 2, used in the present invention.

| | |
|---|---|
| Pigment Dispersion 2 | 20 parts |
| Diethylene glycol | 10 parts |
| Diglycerol | 10 parts |
| Potassium acetate | 1 part |
| Water | 59 parts |

Example 3

Preparation of Pigment Dispersion 3

| | |
|---|---|
| Styrene-acrylic acid copolymer (weight average molecular weight: about 7,000) | 3.5 parts |
| Potassium hydroxide | 1.0 part |
| Diethylene glycol | 5.0 parts |
| Ion-exchanged water | 65.5 parts |

First, the above components were put into a container and mixed, and the mixture obtained was heated to 70° C. with a water bath to make the resin component dissolve completely. Next, to the solution obtained, 24 parts of C.I. Pigment Red 122 and 1.0 part of isopropyl alcohol were added, and these were premixed for 30 minutes, followed by dispersion treatment carried out under the same conditions as those in preparing Pigment Dispersion 1 above. Further, the dispersion thus obtained was treated by centrifugal separation (at 12,000 rpm for 20 minutes) to remove coarse particles to obtain Pigment Dispersion 3, having a solid content of 25%.

Preparation of Ink

The following components were mixed in a beaker, and stirred at 25° C. for 3 hours, followed by pressure filtration using a micro-filter of 1.0 μm in pore size (available from Fuji Photo Film Co., Ltd.) to prepare an ink of Example 3, used in the present invention.

| | |
|---|---|
| Pigment Dispersion 3 | 20 parts |
| Diethylene glycol | 10 parts |
| Diglycerol | 10 parts |
| Potassium acetate | 1 part |
| Water | 59 parts |

Example 4

Preparation of Pigment Dispersion 4

| | |
|---|---|
| Styrene-acrylic acid copolymer (weight average molecular weight: about 7,000) | 3.5 parts |
| Potassium hydroxide | 1.0 part |
| Diethylene glycol | 5.0 parts |
| Ion-exchanged water | 65.5 parts |

First, the above components were put into a container and mixed, and the mixture obtained was heated to 70° C. with a water bath to make the resin component dissolve completely. Next, to the solution obtained, 24 parts of C.I. Pigment Blue 15:3 and 1.0 part of isopropyl alcohol were added, and these were premixed for 30 minutes, followed by dispersion treatment carried out under the same conditions as those in preparing Pigment Dispersion 1 above. Further, the dispersion thus obtained was treated by centrifugal separation (at 12,000 rpm for 20 minutes) to remove coarse particles to obtain Pigment Dispersion 4, having a solid content of 25%.

Preparation of Ink

The following components were mixed in a beaker, and stirred at 25° C. for 3 hours, followed by pressure filtration using a micro-filter of 1.0 μm in pore size (available from Fuji Photo Film Co., Ltd.) to prepare an ink of Example 4, used in the present invention.

| | |
|---|---|
| Pigment Dispersion 4 | 20 parts |
| Diethylene glycol | 10 parts |
| Diglycerol | 10 parts |
| Potassium acetate | 1 part |
| Water | 59 parts |

Example 5

Preparation of Ink

The following components were mixed in a beaker, and stirred at 25° C. for 3 hours, followed by pressure filtration using a micro-filter of 1.0 μm in pore size (available from Fuji Photo Film Co., Ltd.) to prepare an ink of Example 5, used in the present invention.

| | |
|---|---|
| Pigment Dispersion 4 | 20 parts |
| Diethylene glycol | 10 parts |
| Diglycerol | 10 parts |
| Dipotassium succinate | 1 part |
| Water | 59 parts |

Example 6

Preparation of Ink

The following components were mixed in a beaker, and stirred at 25° C. for 3 hours, followed by pressure filtration using a micro-filter of 1.0 μm in pore size (available from Fuji Photo Film Co., Ltd.) to prepare an ink of Example 6, used in the present invention.

| | |
|---|---|
| Pigment Dispersion 4 | 20 parts |
| Diethylene glycol | 10 parts |
| Diglycerol | 10 parts |
| Cesium acetate | 1 part |
| ACETYLENOL EH (available from Kawaken Fine Chemicals Co., Ltd.) | 1 part |
| Water | 58 parts |

Example 7

Preparation of Ink

The following components were mixed in a beaker, and stirred at 25° C. for 3 hours, followed by pressure filtration using a micro-filter of 1.0 μm in pore size (available from Fuji Photo Film Co., Ltd.) to prepare an ink of Example 7, used in the present invention.

| | |
|---|---|
| Pigment Dispersion 4 | 20 parts |
| Diethylene glycol | 10 parts |
| Polyglycerol (weight average molecular weight: about 750) | 10 parts |
| Dipotassium succinate | 1 part |
| Water | 59 parts |

Comparative Examples 1 to 6

Comparative Example 1

Preparation of Ink

The following components were mixed in a beaker, and stirred at 25° C. for 3 hours. The mixture thus obtained was subjected to pressure filtration using a membrane filter of 1.0

μm in pore size (available from Fuji Photo Film Co., Ltd.) to prepare an ink of Comparative Example 1.

| Pigment Dispersion 1 | 30 parts |
|---|---|
| Diethylene glycol | 10 parts |
| 2-Propanol | 2 parts |
| Water | 58 parts |

Comparative Example 2

Preparation of Ink

The following components were mixed in a beaker, and stirred at 25° C. for 3 hours. The mixture thus obtained was subjected to pressure filtration using a membrane filter of 1.0 μm in pore size (available from Fuji Photo Film Co., Ltd.) to prepare an ink of Comparative Example 2.

| Pigment Dispersion 2 | 20 parts |
|---|---|
| Diethylene glycol | 10 parts |
| Water | 54.7 parts |

Comparative Example 3

Preparation of Ink

The following components were mixed in a beaker, and stirred at 25° C. for 3 hours. The mixture thus obtained was subjected to pressure filtration using a membrane filter of 1.0 μm in pore size (available from Fuji Photo Film Co., Ltd.) to prepare an ink of Comparative Example 3.

| Pigment Dispersion 3 | 20 parts |
|---|---|
| Diethylene glycol | 10 parts |
| Water | 54.7 parts |

Comparative Example 4

Preparation of Ink

The following components were mixed in a beaker, and stirred at 25° C. for 3 hours. The mixture thus obtained was subjected to pressure filtration using a membrane filter of 1.0 μm in pore size (available from Fuji Photo Film Co., Ltd.) to prepare an ink of Comparative Example 4.

| Pigment Dispersion 4 | 20 parts |
|---|---|
| Diethylene glycol | 10 parts |
| Water | 54.7 parts |

Comparative Example 5

Preparation of Ink

The following components were mixed in a beaker, and stirred at 25° C. for 3 hours. The mixture thus obtained was subjected to pressure filtration using a membrane filter of 1.0 μm in pore size (available from Fuji Photo Film Co., Ltd.) to prepare an ink of Comparative Example 5.

| Pigment Dispersion 4 | 20 parts |
|---|---|
| Diethylene glycol | 10 parts |
| Diglycerol | 10 parts |
| Water | 54.7 parts |

Comparative Example 6

Preparation of Ink

The following components were mixed in a beaker, and stirred at 25° C. for 3 hours. The mixture thus obtained was subjected to pressure filtration using a membrane filter of 1.0 μm in pore size (available from Fuji Photo Film Co., Ltd.) to prepare an ink of Comparative Example 6.

| Pigment Dispersion 4 | 20 parts |
|---|---|
| Diethylene glycol | 10 parts |
| Potassium acetate | 1 part |
| Water | 54.7 parts |

How the inks of Examples 1 to 7 and Comparative Examples 1 to 6 were chiefly composed is shown together in Table 1.

Evaluation

On the inks of Examples 1 to 7 and Comparative Examples 1 to 6 above, their ejection speed and ejection durability were evaluated.

Ejection Speed

Evaluated by using an ink-jet recording apparatus having an on-demand type multiple recording head (BC-02, manufactured by CANON INC.) ejecting inks by providing the inks with thermal energy in accordance with recording signals. Driving conditions were set to be a drive pulse width of 4.4 μs, a drive voltage of 24.6 V and a drive frequency of 300 Hz. Each ink was set in the apparatus to measure the ejection speed of each ink. Evaluated according to the following criteria. Results obtained are shown in Table 2.

Evaluation Criteria

A: Ejection speed of ink droplets is from 10 m/s or more to 12 m/s or less.

B: Ejection speed of ink droplets is from 8 m/s or more to less than 10 m/s.

C: Ejection speed of ink droplets is less than 8 m/s.

Ejection Durability

Ejection durability was tested also using the same ink-jet recording apparatus as that used in measuring the ejection speed. Driving conditions were set to be a drive pulse width of 4.4 μs, a drive voltage of 24.6 V and a drive frequency of 6,250 Hz. Each ink was continuously ejected under the above conditions to evaluate ejection durability in the following way. Ink droplets corresponding to $1 \times 10^6$ shots which were ejected from the recording head were collected in a container, and this container was weighed with an electronic balance. Stated specifically, the weight of the container before and after the ejection of the ink droplets corresponding to $1 \times 10^6$ shots was weighed to find a gain in weight of the container after the ejection, where an average ejected droplet quantity in the $1 \times 10^6$ shots (i.e., ink quantity for one shot) was calculated. Then, the ink was continuously ejected up to $1 \times 10^8$ shots, and an average ejected droplet quantity found from the droplet quantity corresponding to final $1\times10^6$ shots in the durability test was compared with an average ejected droplet quantity found from the droplet quantity corresponding to first $1\times10^6$ shots in the durability test, to make evaluation according to the following criteria. Results obtained are shown in Table 2.

Evaluation Criteria

A: Average ejected droplet quantity during $9.9\times10^7$ to $1\times10^8$ shots is 90% or more as compared with the average ejected droplet quantity after 0 to $1\times10^6$ shots.

B: Average ejected droplet quantity during $9.9\times10^7$ to $1\times10^8$ shots is from less than 90% to 70% or more as compared with the average ejected droplet quantity after 0 to $1\times10^6$ shots.

C: Average ejected droplet quantity during $9.9\times10^7$ to $1\times10^8$ shots is less than 70% as compared with the average ejected droplet quantity after 0 to $1\times10^6$ shots.

D: The recording head has run into ejection disability on the way of the test.

TABLE 1

Chief Composition of Inks

| | | Compound (d) | | Compound (e) | |
|---|---|---|---|---|---|
| | Pigment | | Amt.* | | Amt.* |
| Example: | | | | | |
| 1 | Carbon black | Diglycerol | 10 | Potassium acetate | 1 |
| 2 | C.I. Pigment Yellow 93 | Diglycerol | 10 | Potassium acetate | 1 |
| 3 | C.I. Pigment Red 122 | Diglycerol | 10 | Potassium acetate | 1 |
| 4 | C.I. Pigment Blue 15:3 | Diglycerol | 10 | Potassium acetate | 1 |
| 5 | C.I. Pigment Blue 15:3 | Diglycerol | 10 | Dipotassium succinate | 1 |
| 6 | C.I. Pigment Blue 15:3 | Diglycerol | 10 | Cesium acetate | 1 |
| 7 | C.I. Pigment Blue 15:3 | Polyglycerol (Mw: 750) | 10 | Dipotassium succinate | 1 |
| Comparative Example: | | | | | |
| 1 | Carbon black | None | 0 | None | 0 |
| 2 | C.I. Pigment Yellow 93 | None | 0 | None | 0 |
| 3 | C.I. Pigment Red 122 | None | 0 | None | 0 |
| 4 | C.I. Pigment Blue 15:3 | None | 0 | None | 0 |
| 5 | C.I. Pigment Blue 15:3 | Diglycerol | 10 | None | 0 |
| 6 | C.I. Pigment Blue 15:3 | None | 0 | Potassium acetate | 1 |

*(part)

TABLE 2

Evaluation Results

| | Ejection speed | Ejection durability |
|---|---|---|
| Example: | | |
| 1 | A | A |
| 2 | A | A |
| 3 | A | A |
| 4 | A | A |
| 5 | A | A |
| 6 | A | A |
| 7 | A | A |
| Comparative Example: | | |
| 1 | C | C |
| 2 | C | C |
| 3 | C | C |
| 4 | C | C |
| 5 | C | C |
| 6 | B | B |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-342192, filed Dec. 20, 2006, which is hereby incorporated by reference in its entirety.

What is claimed is:

1. An ink used in an ink jet recording method in which ink droplets are ejected from a recording head by the action of thermal energy to record an image on a recording medium, the ink comprising:
   (a) a pigment;
   (b) a dispersing agent;
   (c) a liquid medium;
   (d) a polyglycerol; and
   (e) a cesium salt of a carboxylic acid.

2. The ink according to claim 1, wherein the component (d) is at least one selected from diglycerol, triglycerol, tetraglycerol, pentaglycerol, hexaglycerol, heptaglycerol, octaglycerol, nonaglycerol, decaglycerol, and a polyglycerol having a weight average molecular weight of from 200 to 1,000.

3. The ink according to claim 1, wherein the component (e) is cesium acetate.

4. The ink according to claim 1, wherein the component (d) is present in a content of from 0.5% by mass to 20% by mass based on the total mass of the ink.

5. The ink according to claim 1, wherein the component (e) is present in a content of from 0.005% by mass to 5% by mass based on the total mass of the ink.

6. An ink jet recording method which comprises the step of ejecting the ink according to claim 1 from a recording head by the action of thermal energy to record an image on a recording medium.

* * * * *